(12) United States Patent
Demandolx

(10) Patent No.: US 7,656,415 B2
(45) Date of Patent: Feb. 2, 2010

(54) AGGREGATION OF CURVE EFFECTS

(75) Inventor: Denis C. Demandolx, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 489 days.

(21) Appl. No.: 11/414,773

(22) Filed: Apr. 28, 2006

(65) Prior Publication Data

US 2007/0252837 A1  Nov. 1, 2007

(51) Int. Cl.
*G09G 5/02* (2006.01)
(52) U.S. Cl. .............. 345/602; 345/600; 345/601; 345/501
(58) Field of Classification Search ........ 345/589, 345/601–602, 440–442; 382/302, 303
See application file for complete search history.

(56) References Cited

U.S. PATENT DOCUMENTS

| | | | | |
|---|---|---|---|---|
| 5,208,911 | A * | 5/1993 | Newman et al. | 345/600 |
| 5,321,797 | A * | 6/1994 | Morton | 345/604 |
| 5,420,979 | A * | 5/1995 | Madden et al. | 345/501 |
| 5,432,906 | A * | 7/1995 | Newman et al. | 345/501 |
| 5,633,955 | A | 5/1997 | Bozinovic et al. | |
| 5,786,823 | A * | 7/1998 | Madden et al. | 345/591 |
| 6,175,663 | B1 | 1/2001 | Huang | |
| 6,181,836 | B1 | 1/2001 | Delean | |
| 6,441,823 | B1 | 8/2002 | Ananya | |
| 6,654,485 | B1 | 11/2003 | Mitra et al. | |
| 6,711,304 | B2 | 3/2004 | White | |
| 2001/0028351 | A1* | 10/2001 | Arai et al. | 345/475 |
| 2003/0156110 | A1 | 8/2003 | Jiang et al. | |
| 2004/0174363 | A1 | 9/2004 | Staples et al. | |
| 2004/0247181 | A1 | 12/2004 | Wenzel et al. | |
| 2007/0139438 | A1* | 6/2007 | White | 345/602 |

FOREIGN PATENT DOCUMENTS

WO  WO 87/01831 A1  3/1987

OTHER PUBLICATIONS

P. Ljung & A. Ynnerman; Extraction of Intersection curves from Iso-surfaces on co-located 3D grids (http://www.ep.liu.se/ecp/010/006/ecp01006.pdf).
D.F. Wong & P. S. Sakhamuri; Efficient Floorplan Area Optimization; 26th ACM/IEEE Design Automation Conference (Paper 36.4).
S. S. Abhyankar, S. Chandrasekar & V. Chandru; Improper Intersection of Algebraic Curves; ACM Transactions on Graphics, vol. 9, No. 2, Apr. 1990, pp. 147-159.

* cited by examiner

*Primary Examiner*—Jin-Cheng Wang
(74) *Attorney, Agent, or Firm*—Shook, Hardy & Bacon LLP

(57) ABSTRACT

A system, a method and computer-readable media for aggregating curves. An aggregated curve is generated by associating input values from a first curve with output values from a second curve. This aggregated curve may be used, for example, to apply multiple curve effects to a digital image.

17 Claims, 7 Drawing Sheets

AGGREGATION OF CURVE EFFECTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The field of graphics processing applications, including image-processing packages, has broadened and matured to a point where many image processing programs and tools are capable of adjusting an array of image characteristics. Broadly speaking, many of these adjustments revolve around altering the color composition of a digital photograph or other image, or the exposure or lighting characteristics of the subject image or file. Within each category of task, commercially available programs typically offer a number of tools that change the relative amounts of red, green or blue (RGB) components or cyan, magenta, yellow or black (CMYK) component color in the pixels of an image.

To alter the color composition of an image, the color values associated with the image's pixels must undergo a transformation operation. These transformations may be referred to as effects. Certain effects use linear operations to alter the pixel values. For example, a levels effect uses a first-order curve with a linear slope to alter pixel data. As another example of a linear operation, a channel mixer effect is a three-dimensional matrix channel mapping of colors.

Non-linear operations may also be used to alter the color composition of an image. For example, curve effects are non-linear, single pixel channel transforms. These curve effects map each pixel's RGB channel data to new values based on a one-dimensional mapping or "curve." There are usually independent curves for each channel. So, for a single curve effect, there may be a different curve for the red, green and blue color channels. Curve effects may be used with controls for altering contrast, brightness, saturation or exposure.

An effect pipeline is often used to make modifications to an image. As known to those skilled in the art, an effect pipeline relates to a series of sequentially performed image-processing steps. The effect pipeline is generally designed to allow efficient processing of a digital image, while taking advantage of available hardware. For example, the pipeline may perform significant operations on a dedicated graphics processor unit (GPU). Effects pipelines today are used to dynamically modify image data "non-destructively." "Non-destructive editing" or "non-destructive processing" refers to editing (or processing) wherein rendering takes place beginning from unaltered originally-loaded image data. Each time a change is made, the alteration is added as one or more adjustments (or effects) added to the end of the pipeline. Hence the pipeline reflects the revision history (or progeny) of the image.

One limitation of conventional effect pipelines is that the non-destructive editing approach does not scale. In long effect pipelines, the application of curve effects can greatly increase delay and processing time. This result is exacerbated when adjustments are applied to effects near the beginning of the pipeline. As each subsequent effect needs to be re-applied for each render, the delay may be roughly proportional to the number of effects involved. To mitigate this delay, the adjacent linear operations may be aggregated into a single process. As known to those skilled in the art, linear operations can be easily combined into a single operation to enhance performance. When linear adjustments are not adjacent, the pipeline can often be re-ordered to aggregate them together. However, curve effects cannot be so easily combined. In fact, there are currently no techniques in the art for aggregating arbitrary non-linear pixel effects or even arbitrary non-linear 'curve' effects. Accordingly, multiple curve effects decrease performance in an effect pipeline and cause delays that are often noticeable to a user—often so much so that it makes non-destructive processing models impractical.

SUMMARY

The present invention meets the above needs and overcomes one or more deficiencies in the prior art by providing systems and methods for aggregating curves. For example, multiple curve effects may be aggregated in an effect pipeline. An aggregated curve is generated by associating input values from a first curve with output values from a second curve. This aggregated curve may be used, for example, to apply the multiple curve effects to a digital image.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Figure 1:
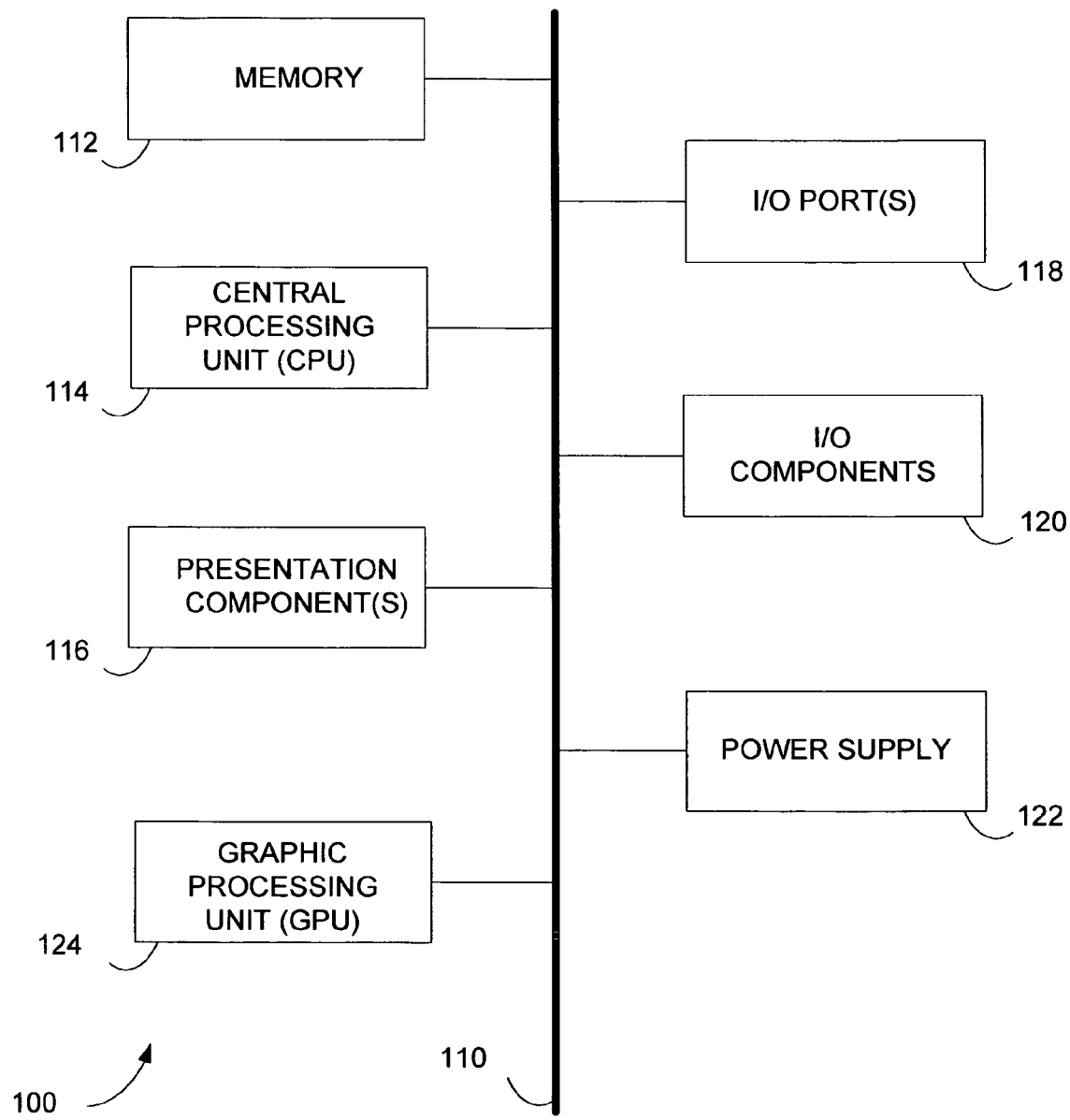
FIG. 1 is a block diagram of an exemplary computing system environment suitable for use in implementing the present invention.

An exemplary operating environment for the present invention is described below. Referring initially to FIG. 1, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices (e.g., cameras and printers), etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, a central processing unit (CPU) 114, one or more presentation components 116, input/output ports 118, input/output components 120, an illustrative power supply 122 and a graphics processing unit (GPU) 124. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, CPUs and GPUs have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of physical computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other physical medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As previously mentioned, embodiments described herein provide systems and methods that may be used to apply effects to a digital image. It will be understood and appreciated by those of ordinary skill in the art that a "digital image," as the term is utilized here, refers to any digital image data including static and/or dynamic digital image and any and all combinations or variations thereof. Utilizing the systems and methods herein described, pixel data may be transformed in a variety of ways.

To apply effects, Directed Acyclic Graphs ("graphs") or effect pipelines may be utilized. A graph may be implemented by using a GPU, a CPU or some combination of the two. GPUs differ from CPUs in that they utilize very high speed memory and couple it with a specialized processor that is capable of handling simple calculations on pixel data very efficiently. GPUs are not general-purpose processors. The GPU can perform fast pixel transformations, as well as 3D geometric transformations, much more rapidly than a CPU could accomplish the same task. This is largely due to the fact that, while CPUs can adequately perform a variety of general tasks, they are not optimized for any particular operation whereas GPU utilize very specialized hardware to perform graphics processing tasks.

The digital image processing model architecture described herein (i.e., the effect pipeline or graph) is comprised of elements referred to herein as effects. An effect, as that term is utilized herein, is a basic image processing class. That is, effects are basically pixel operators. They take in one or more buffers of pixel data, manipulate the data, and output modified pixels. For instance, a sharpening effect takes in image pixels, sharpens the pixel edges, and outputs an image that is sharper than the image pixels taken in. In another example, a color balance effect takes in image pixel data, adjusts the color balance of the pixels, and outputs and image having modified color balance from what was taken in. The primary function of an effect is thus to process pixels.

Different effects, e.g., masking, blending, rotating, and the like, may be defined to implement a variety of image processing algorithms. In some embodiments, users are permitted to wire pre-defined effects together to achieve a desired result. If desired, a user may also define new effects to implement interesting image processing algorithms. Effects can process any number of input images and produce any number of output images.

Figure 2:
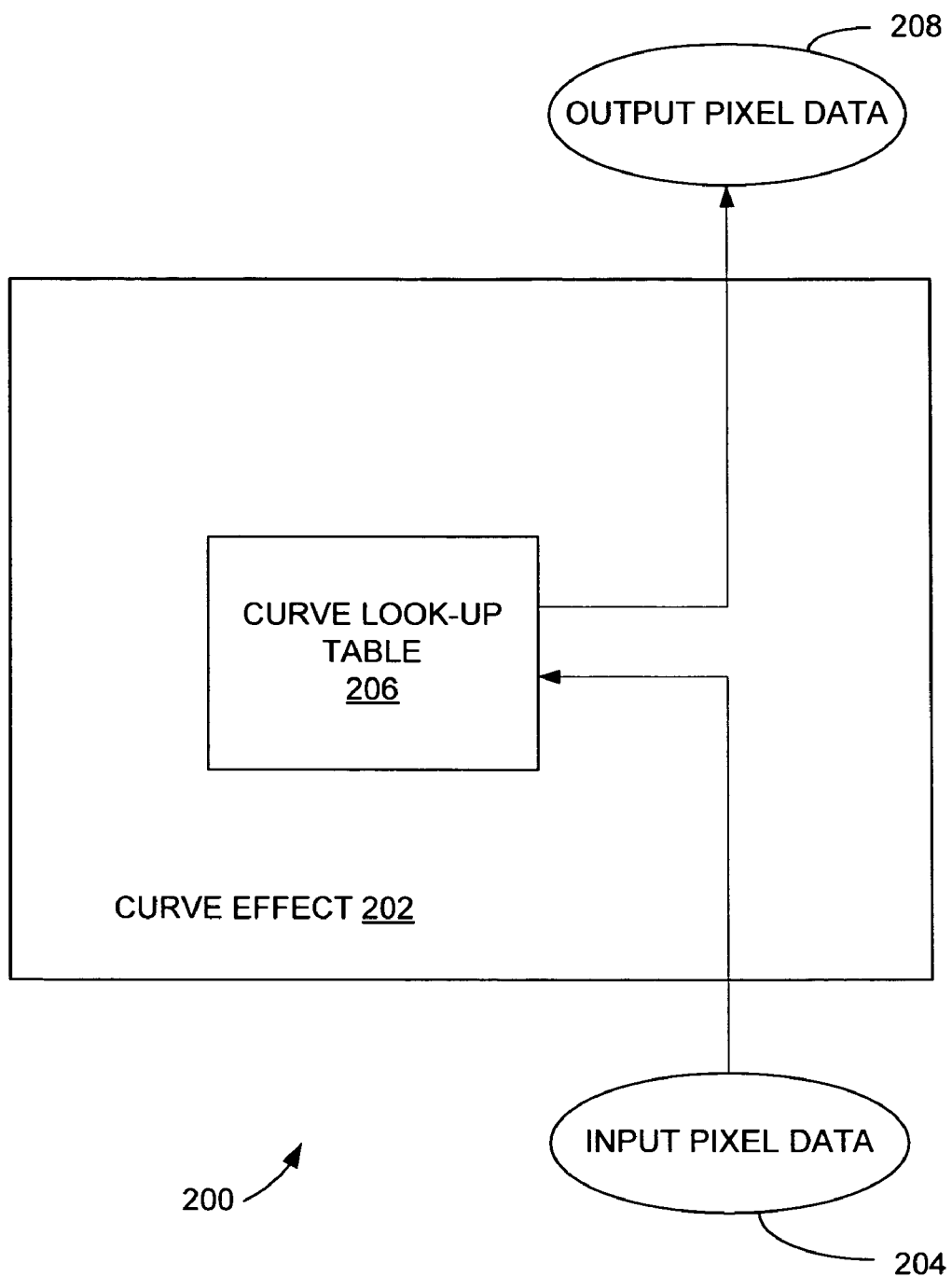
FIG. 2 is a schematic diagram illustrating an exemplary system for applying a curve effect to input data.

FIG. 2 illustrates a system 200 for applying a curve effect 202 to a digital image. Input pixel data 204 is fed into the curve effect 202. The input pixel data 204 may be derived from a digital image. A digital image may be comprised of pixels, and each of these pixels may have values indicating the pixel's color. For example, a pixel may have data indicating red, green and blue values.

When the curve effect 202 is applied to the input pixel data 204, the color values from the various pixels are converted into new values so as to reflect application of the curve effect 202. To make this conversion, a curve look-up table 206 is used. The look-up table 206 represents a curve as a series of data points. Each data point may be though of as having an input value and an output value, so the curve may be thought of as being represented by a set of input values that are associated with a set of output values. An input image may have a pixel with a red color channel value of 5. To apply the curve effect 202 to this pixel's red channel value, the output value associated with a red input of five is located in the look-up table 206. This output value is stored as output pixel data 208. If the input value is not found in the look-up table 206, an interpolation operation may be performed to generate the result of applying the curve to the input value. As will be appreciated by those skilled in the art, linear interpolation between the two nearest values present in the look-up table entries is a common method. With such an interpolation approach, it is possible to work with floating point values. In one embodiment, the look-up table 206 is an image, and the values of the incoming pixel data 204 are used to locate the addresses of output values in the curve look-up table 206. Further, the system 200 may include multiple look-up tables. For images having three color channels, three separate look-up tables may be employed. In one embodiment, the look-up table 206 is loaded from an application and is calculated from parameter values such as exposure correction, contrast or film response. As will be appreciated by those skilled in the art, each pixel value of an input image may be converted to an output value by the system 200.

It should be noted that any number of curve and non-curve transformations may be made with a look-up table such as the look-up table 206. These transformations may be referred to as "table-lookup effects." For example, arbitrary static or dynamic effects that map input data to output data may be table-lookup effects. Those skilled in the art will appreciate that, while the term "curve effects" is often used herein, the present invention in not limited to curve effect, and the present invention may be used to aggregate any number of table-lookup effects.

Figure 3:
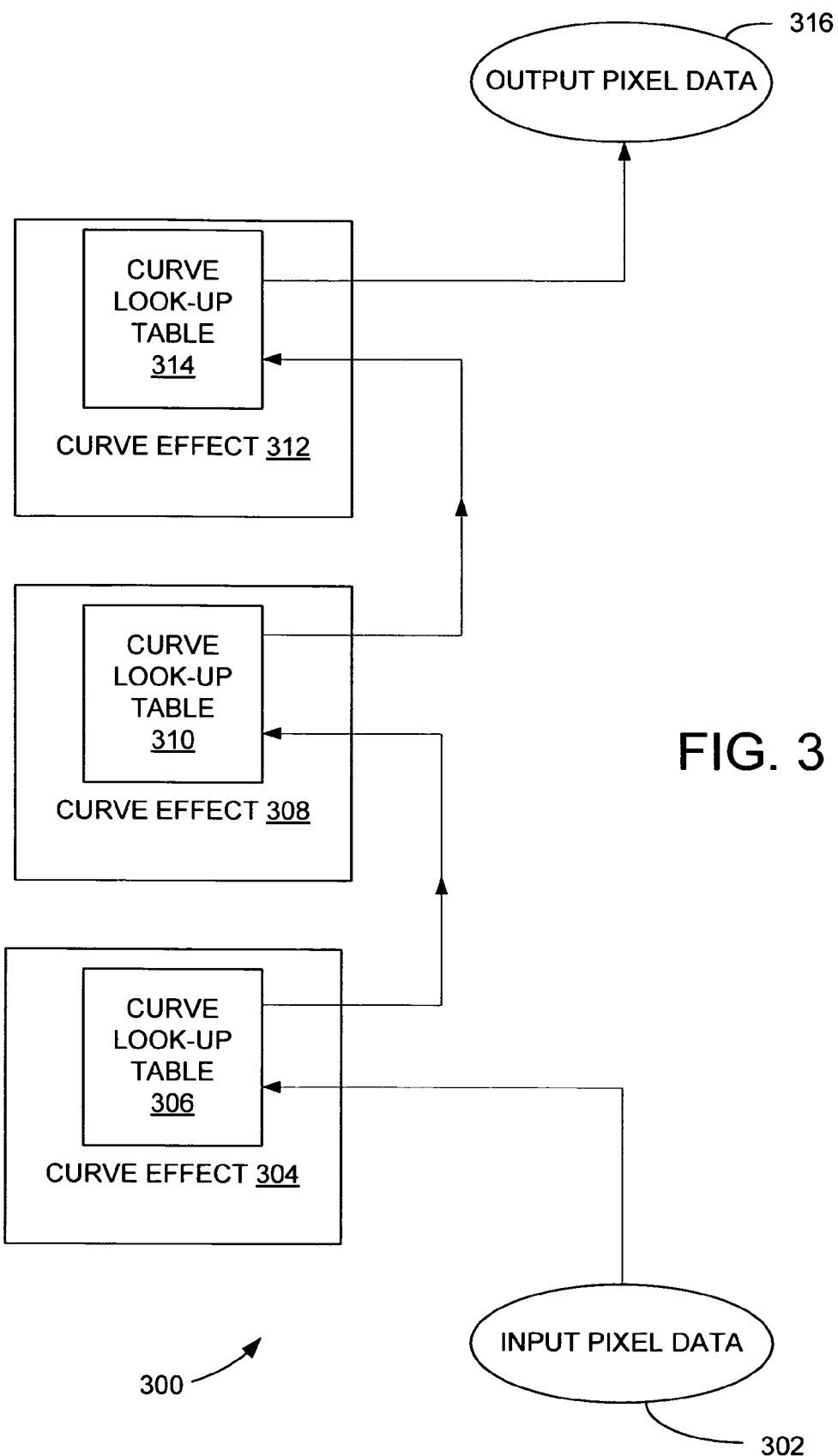
FIG. 3 is a schematic diagram illustrating an exemplary system for applying multiple curve effects to input data.

In an effect pipeline that applies a series of curve effects, each output image is fed into the input of the next curve effect. FIG. 3 illustrates a system 300 for applying a series of curve effects to a digital image. Input pixel data 302 is fed into a curve effect 304. The curve effect 304 uses a curve look-up table 306 to generate output data. In sequence, this output data is fed into a curve effect 308 and then into a curve effect 312. The data is converted as dictated by a curve look-up table 306, curve look-up table 308 and a curve look-up table 314. The resulting output pixel data 316 can then be used to form an output image reflecting the application of the curve effects 304, 308 and 312 to an input image. As will be appreciated by those skilled in the art, a large amount of image data must be mapped at each stage of the system 300 for typical image processing requests. As a separate lookup must be performed for each color channel, a series of curve effect lookups can quickly consume GPU (or CPU) resources.

Figure 4:
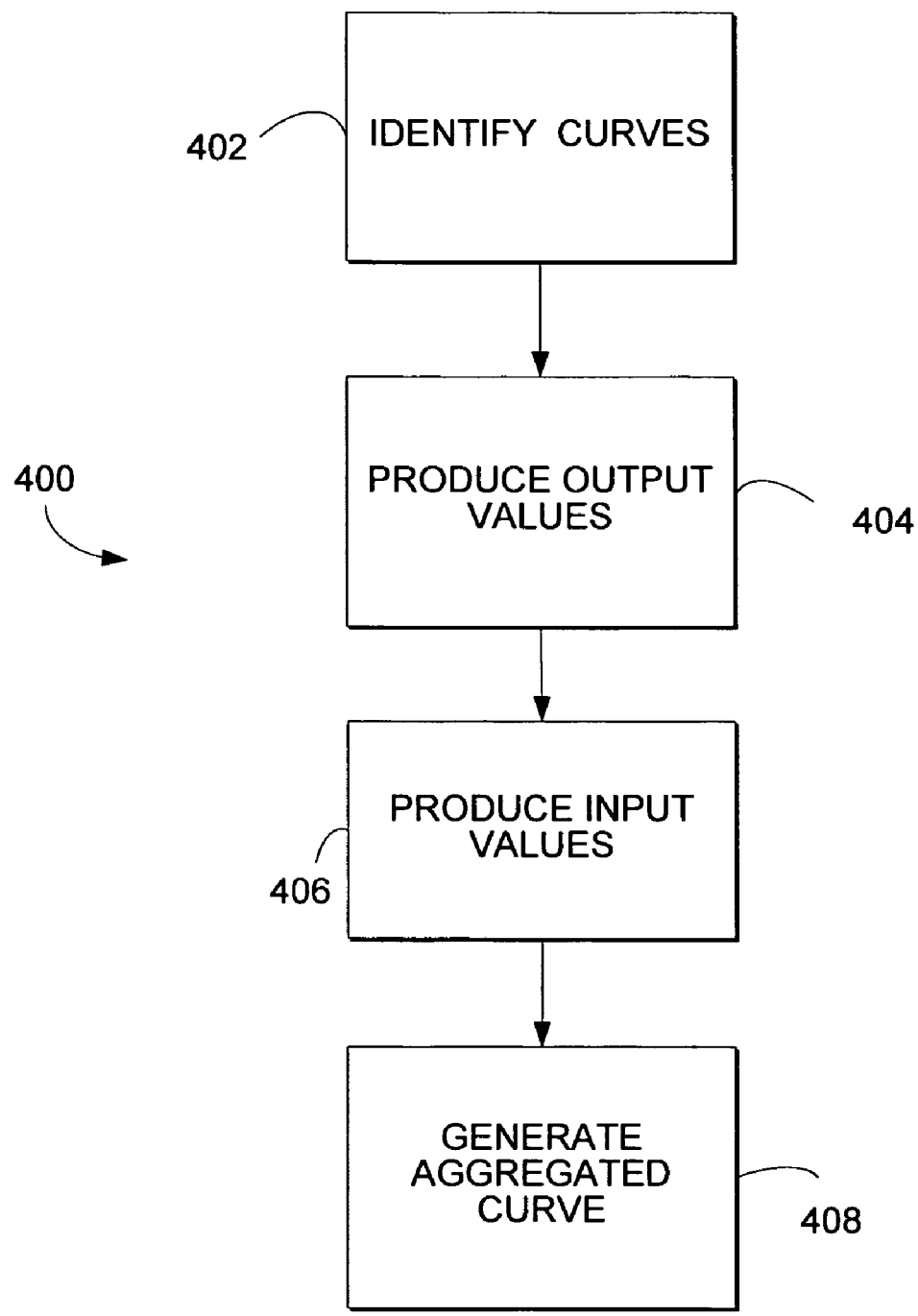
FIG. 4 illustrates a method for aggregating curve effects in accordance with one embodiment of the present invention.

As previously mentioned, the aggregation of multiple effects into a single transformation can improve the performance of a digital processing application. FIG. 4 illustrates a method 400 for aggregating curves in accordance with one embodiment. At 402, the method 400 identifies two curves, a first curve and a second curve, to be aggregated. The first curve is represented by a first set of input values and a first set of output values, while the second curve is represented by a second set of input values and a second set of output values. In one embodiment, the input and output values for each curve may be compiled in a look-up table. The look-up table may generally be described as a set of input values that are associated with a set of output values. So for a given input, the look-up table may be consulted, and the output value associated with the input may be identified. If the specific input is not in the set of input values, an interpolation technique may be utilized. Those skilled in the art will appreciate that it is well known to represent curves as a look-up table.

The method 400, at 404, produces a new set of output values. As mentioned above, the first curve is represented by a first set of input values and a first set of output values. These output values, of course, represent application of the first curve to the first set of input values. To generate the new set of output values, the method 400 applies the second curve to the first set of output values. There are numerous techniques in the art for applying a curve to a set of values. For example, if the curve is represented as a look-up table, output values may be located on the table, and interpolations may be performed when necessary. By applying the second curve to each value from the first set of output values, the new set of output values is created. The new set of output values represents the result of applying both the first and the second curve to the first set of input values. So each value in the new set of output values may be associated with (i.e., mapped back to) a value in the first set of inputs. This new set of output values may be referred to hereinafter as the third set of output values. As will be appreciated by those skilled in the art, associating the values in the first set of input values with values in the third set of output values allows a portion of the data points on an aggregated curve to be defined.

At 406, the method 400 produces a new set of input values. As mentioned above, the second curve is represented by a second set of input values and a second set of output values. To produce the new set of input values, the second set of input values are compared to the outputs of the first curve. This comparison allows the new set of inputs to be determined by finding the inputs to the first curve that will generate the second set of input values. Stated mathematically, for each input of the second curve, $X2_i$, the method 400 finds a corresponding input of the first curve, $X1_i$, by solving the equation $X2_i = \text{first curve}(X1_i)$ for $X1_i$. Those skilled in the art will appreciate that there are numerous techniques for solving this equation. For example, if the first curve is represented with a look-up table, the equation may be solved by performing a reverse lookup, i.e., by finding where each $X2_i$ value resides on the output side of the table and identifying the associated input value. As will be appreciated by those skilled in the art, if linear interpolation is used between points that define the curve, the equations are trivial linear systems with only one unknown value.

The new set of inputs values represents input values that will yield the second set of output values when both the first and the second curves are applied to the new set of input values. Application of the first curve to the new set of inputs values will yield the second set of input values, and application of the second curve to the second set of inputs values will yield the second set of output values. So each value in the new set of input values may be associated with (i.e., mapped forward to) a value in the second set of outputs. This new set of input values may be referred to hereinafter as the third set of input values. As will be appreciated by those skilled in the art, associating each value in the third set of inputs with a value in the second set of outputs allows an additional portion of the data points on the aggregated curve to be defined.

The method 400, at 408, generates the aggregated curve. In one embodiment, the aggregated curve includes data points with input values (X values) from the first set of input values and output values (Y values) from the third set of output values. As previously mentioned, the third set of output values represents the outputs of the application of first and the second curves to the first set of input values. The aggregated curve may further include data points with input values (X values) from the third set of input values and output values (Y values) from the second set of output values. The second set of output data represents the outputs of the application of first and the second curves to the third set of input values. Accordingly, the aggregated curve has a new input set that is the union of the first and the third set of input values and has a new output set that is the union of the second and the third set of output values. By plotting the aggregated curve's data points, the aggregated curve may be represented graphically, and the data points may be compiled in a look-up table. To apply the aggregated curve, an input value may be located on the look-up table, and its corresponding output value may be identified. As will be appreciated by those skilled in the art, the aggregated curve may be used to apply the first and the second curves to input values. Because only the aggregated curve is applied to the inputs, the method 400 may facilitate the application of multiple curves. For example, the first and the second curves may be associated with curve effects, and these curve effects may be applied to pixel data by using the aggregated curve.

Figure 5:
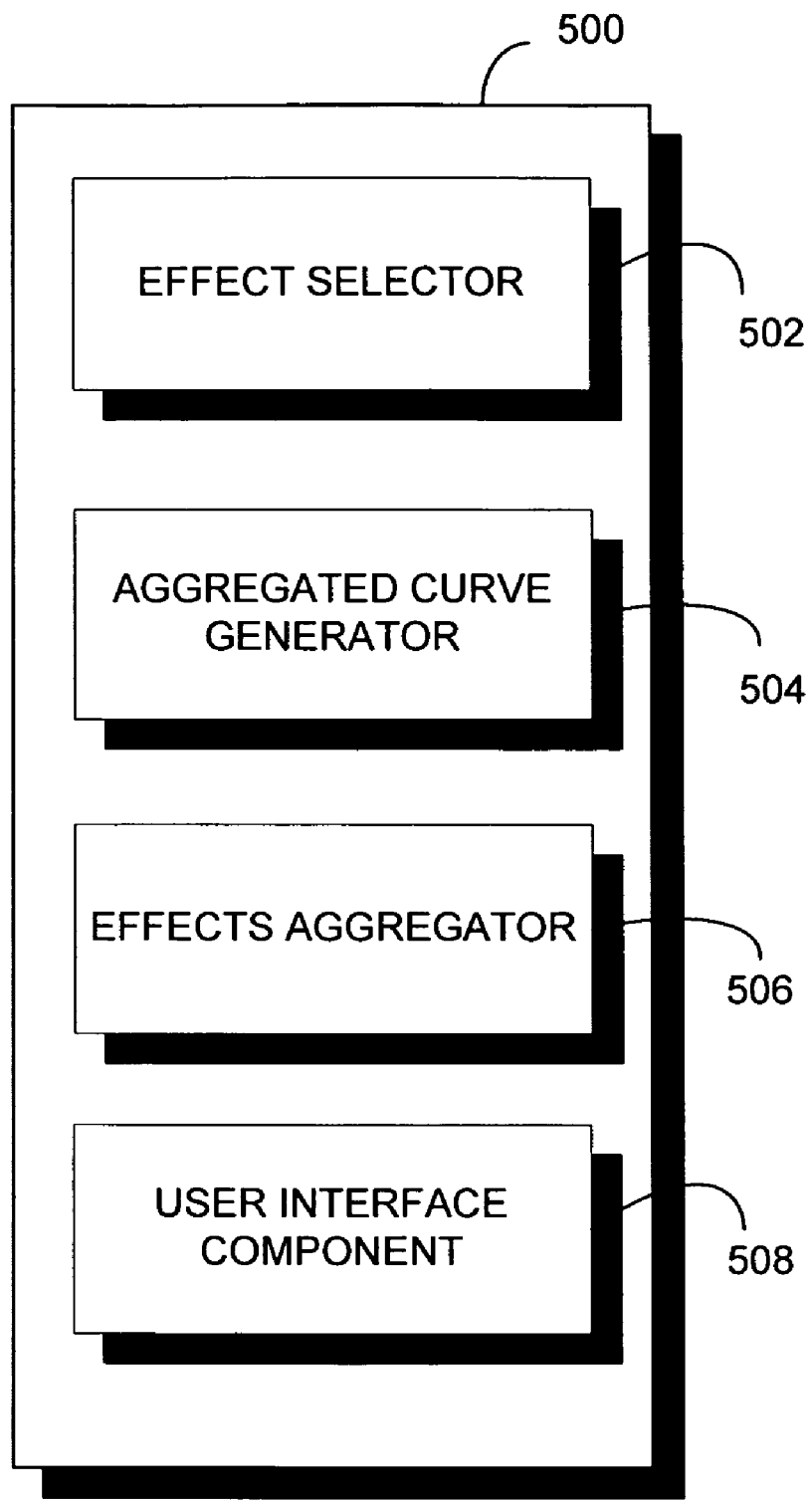
FIG. 5 is a schematic diagram illustrating a system for applying multiple curve effects in accordance with one embodiment of the present invention.

FIG. 5 illustrates a system for applying multiple curve effects in accordance with one embodiment of the present invention. The system 500 includes a curve effect selector 502. The curve effect selector 502 may be configured to identify a plurality of curve effects to be aggregated. The curve effects may be identified from a variety of sources. For example, the curve effect selector 502 may scan a graph for sequential effects. Further, an image processing application may automatically select effects based on various inputs and parameters.

Figure 6A:
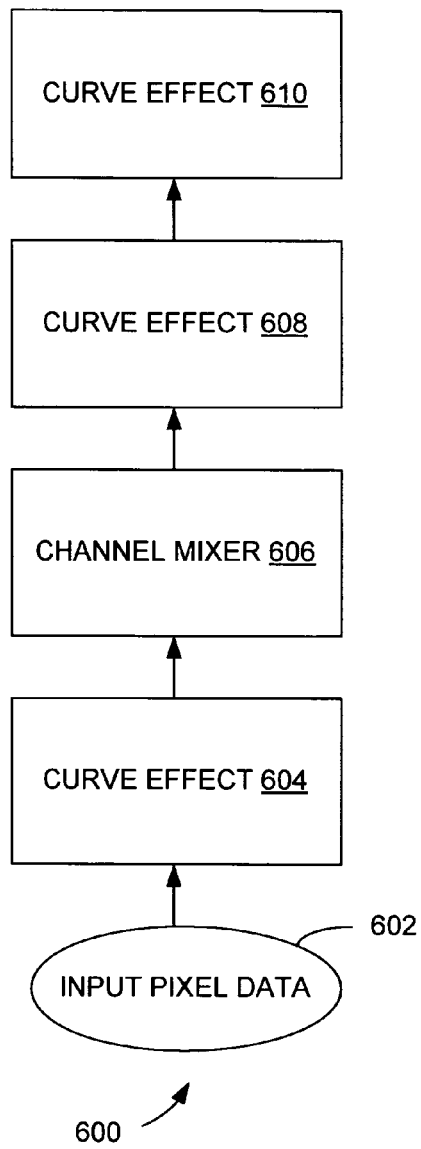
FIGS. 6A and 6B are a schematic diagram illustrating an exemplary effect pipeline in accordance with one embodiment of the present invention.
Figure 6B:
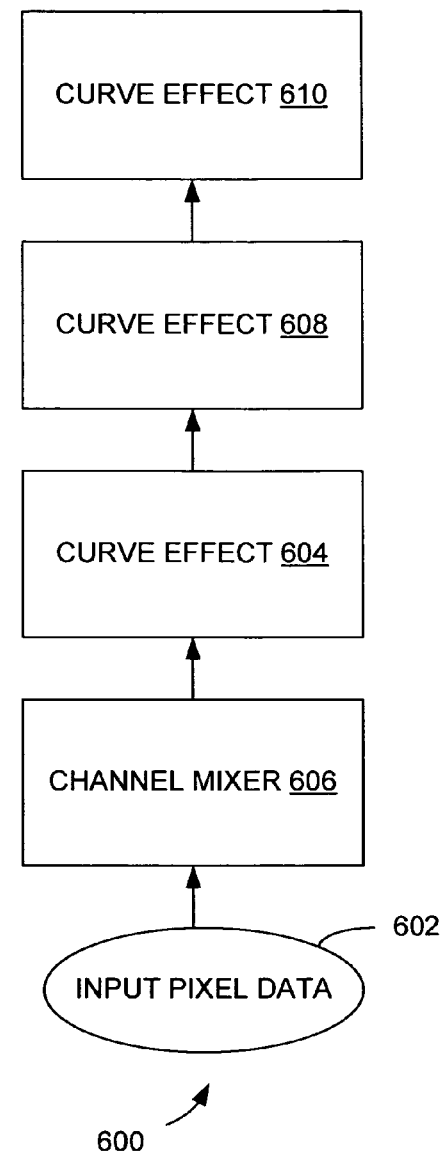

The curve effect selector 502 may also be configured to re-order operations in an effect pipeline so the identified effects are grouped into contiguous runs. Stated another way, the curve effect selector 502 may re-order the sequence of image processing steps so each of the identified effects occur one-after-the-other in the pipeline. FIGS. 6A and 6B provide an example of this reordering of an effect pipeline. FIG. 6A illustrates an exemplary effect pipeline 600. The effect pipeline 600 accepts input pixel data 602 from an image to be processed, and a first effect, a curve effect 604, is applied to the data 602. Subsequently, a Channel Mixer 606 applies a linear operation to the data 602. The image processing concludes after a curve effect 608 and a curve effect 610 are applied. Without re-ordering the effect pipeline 600, the curve effects 604, 608 and 610 cannot be aggregated because a linear operation, the Channel Mixer 606, is positioned between the curve effects 604 and 608. FIG. 6B illustrates the effect pipeline 600 that results from re-ordering the curve effects 604, 608 and 610. After the reordering, the linear operation, the Channel Mixer 606, is performed first, and then the curve effects 604, 608 and 610 are applied. As will be appreciated by those skilled in the art, so long as clipping and pixel bit-depth are not limiting factors, non-linear steps (e.g., exposure, color and contrast correction) may be easily applied as contiguous steps, while other non-aggregatable steps (e.g., saturation, channel mixing and sharpening) are moved to other parts of a pipeline. Unlike linear operations, which are commutative, order is sometimes important with non-linear operations, and in some cases, re-ordering is not an option.

Returning to FIG. 5, the system 500 also includes an aggregated curve generator 504. The aggregated curve generator 504 may be configured to generate an aggregated curve and/or an aggregated look-up table for use in the application of the aggregated effects. Similar to the curve look-up table 206 of FIG. 2, the aggregated look-up table provides output values associated with a set of input values. Generally, the aggregated look-up table provides the outputs that would result if input pixel data were fed through each curve effect separately. For inputs that are not in the set of points defining the curve, the system 500 may use a linear interpolation method to generate outputs. In this manner, the aggregate curve will generate the same outputs as the application of each individual curve one after the other. Such a result occurs because the composition of linear functions is also a linear function. In one embodiment, instead of subjecting image data to the many look-ups of a system such as the system 300 of FIG. 3, an aggregated look-up table allows multiple curve effects to be applied with a single set of look-ups.

A variety of techniques may be utilized to generate the aggregated look-up table. For example, a first and a second curve may be selected for aggregation. Output values from the first curve may be input into the second curve to generate a new set of output values. Each value in the new set of output values may be associated with (i.e., mapped back to) an input to the first curve to yield a data point on the aggregated curve. These data points may be used in the aggregated look-up table because they represent the result of applying both the first and the second curve to input values.

Additional data points on the aggregated curve may be derived by finding inputs to the first curve that may be associated with inputs to the second curve. For each input of the second curve, $X2_i$, a corresponding input to the first curve, $X1_i$, may be determined by solving the equation $X2_i = $curve one $(X1_i)$ for $X1_i$. The inputs values $X1_i$ represent input values that will yield a second set of output values, $Y2_i$, when both the first and the second curve are applied to the input values $X1_i$. So each value in the new set of input values $X1_i$ may be associated with (i.e., mapped forward to) a value in the second set of outputs $Y2_i$ to yield a data point on the aggregated curve. These data points may also be used in the aggregated look-up table because they represent the result of applying both the first and the second curve to input values.

The system 500 also includes an effects aggregator 506. The effects aggregator 506 is configured to apply multiple curve effects to a digital image by utilizing the aggregated curve/aggregated look-up table. Pixel values from the digital image are fed into the aggregated look-up table, and output values are identified. These output values are combined to form an output image that reflects application of the curve effects.

To display this output image, the system 500 includes a user interface component 508. Those skilled in the art will appreciate that the output image generated by the system 500, while only requiring one set of look-up operations, should be substantially identical to an output image generated by the multiple look-ups of the system 300 of FIG. 3.

Figure 7:
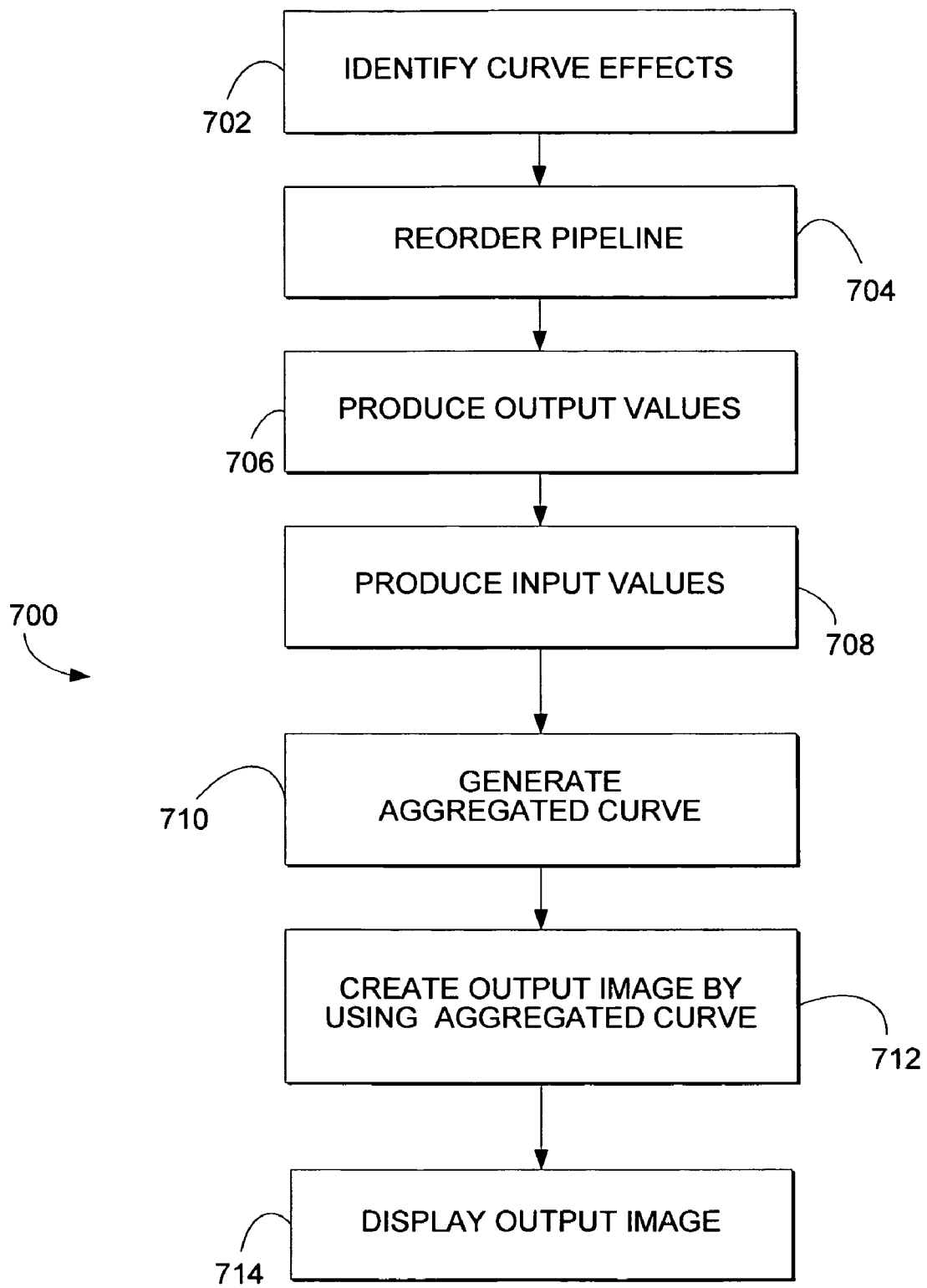
FIG. 7 illustrates a method in accordance with one embodiment of the present invention for applying curve effects.

FIG. 7 illustrates a method 700 for applying curve effects to a digital image. At 702, the method 700 identifies multiple curve effects in an effect pipeline. For example, a first effect associated with a first curve may be identified, as well as a second effect associated with a second curve. The method 700, at 704, reorders the effect pipeline to make the identified effects contiguous operations in the pipeline.

The method 700, at 706, produces a new set of output values. In one embodiment, the method 700 applies the second curve to a set of output values from the first curve. This application allows the new set of output values to be created, and the new set of output values represents the application of both the first and the second curve to inputs values of the first curve. At 708, the method 700 produces a new set of input values. In one embodiment, for each input of the second curve, a corresponding input of the first curve is determined.

These inputs values may be associated with an output of the second curve. By associating inputs of the first curve with outputs of the second curve, data points on the aggregated curve may be defined.

The method 700, at 710, generates an aggregated curve that includes data points associating input values from the first curve with output values from the new set of output values. The aggregated curve further includes data points associating the new input values with output values from the second curve. These data points have been previously discussed, and they indicate the effect of applying the first and the second curves to input values.

At 712, the method 700 uses the aggregated curve to create an output image by applying the identified curve effects to a digital image. Instead of subjecting the input image to look-ups for each selected effect, the method 700 uses the aggregated curve to apply multiple effects as if only one effect were being applied. Pixel values from the input image are converted into output pixels. The method 700 presents these output pixels as an output image at 714.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. One or more computer-readable media having computer-useable instructions embodied thereon to enable a computer, having one or more processors and a memory, to perform a method for aggregating curves, said method comprising:
    identifying, by way of said one or more processors, a first curve and a second curve, wherein said first curve is represented by a first set of input values associated with a first set of output values, and wherein said second curve is represented by a second set of input values associated with a second set of output values;
    producing, by way of said one or more processors, a third set of output values by performing a forward lookup in which said second curve is applied to at least a portion of said first set of output values;
    producing, by way of said one or more processors, a third set of input values by performing a reverse lookup to determine a plurality of input values that yield at least a portion of said second set of input values when said first curve is applied to said plurality of input values;
    generating an aggregated curve, wherein said aggregated curve is represented by at least a portion of said first set of input values associated with at least a portion of said third set of output values, and wherein said aggregated curve is further represented by at least a portion of said third set of input values associated with at least a portion of said second set of output values;
    storing said aggregated curve on said memory; and
    creating, by way of said one or more processors, an output image by utilizing said aggregated curve to apply said first curve and said second curve to a digital image.

2. The media of claim 1, wherein said first curve is associated with a first effect and wherein said second curve is associated with a second effect.

3. The media of claim 2, wherein said method further comprises utilizing said aggregated curve to apply said first effect and said second effect to a digital image.

4. The media of claim 3, wherein said first effect and said second effect are selected for application by an effect pipeline.

5. The media of claim 1, wherein said first curve is represented by a first look-up table that incorporates at least a portion of said first set of input values and at least a portion of said first set of output values.

6. The media of claim 5, wherein said second curve is represented by a second look-up table that incorporates at least a portion of said second set of input values and at least a portion of said second set of output values.

7. The media of claim 1, wherein said aggregated curve is represented by a look-up table that incorporates at least a portion of said first set of input values, at least a portion of said third set of output values, at least a portion of said third set of input values and at least a portion of said second set of output values.

8. The media of claim 1, wherein said producing said third set of output values utilizes linear interpolation to apply said second curve to at least a portion of said first set of output values.

9. A system implemented by a computer having one or more processors and a memory for aggregating the application of effects to a digital image, said system comprising:
    an effect selector configured to, when executed by way of said one or more processors, identify a first effect and a second effect, wherein said first effect includes a first curve represented by a first set of input values associated with a first set of output values, and wherein said second effect includes a second curve represented by a second set of input values associated with a second set of output values;
    an aggregated curve generator configured to, when executed by way of said one or more processors, generate an aggregated curve by creating an aggregated look-up table, wherein said aggregated look-up table includes at least a portion of said first set of input values associated with a third set of output values, and wherein said aggregated look-up table further includes a third set of input values associated with at least a portion of said second set of output values; and
    an effects aggregator configured to, when executed by way of said one or more processors, generate an output image by utilizing said aggregated look-up table to apply said aggregated curve to said digital image;
    wherein said third set of input values is produced by performing a reverse lookup to determine a plurality of input values that yield at least a portion of said second set of input values when said first curve is applied to said plurality of input values.

10. The system of claim 9, wherein said effect selector is configured to utilize one or more user inputs in identifying at least one of said first effect and said second effect.

11. The system of claim 9, wherein said first curve is represented by a first look-up table, and wherein said second curve is represented by a second look-up table.

12. The system of claim 9, wherein said third set of output values is produced by applying said second curve to at least a portion of said first set of output values.

13. The system of claim 9, wherein said system further comprises a user interface component configured to display said output image to a user.

14. One or more computer-readable media having computer-useable instructions embodied thereon to enable a computer, having one or more processors and a memory, to perform a method for applying effects to a digital image, said method comprising:
    identifying a first effect and a second effect, wherein said first effect has a first curve represented by a first set of input values associated with a first set of output values, and wherein said second effect has a second curve represented by a second set of input values associated with a second set of output values;

re-ordering an effect pipeline to make said first effect and said second effect contiguous operations in an effect pipeline;

producing a third set of output values by performing a forward lookup in which said second curve is applied to at least a portion of said first set of output values;

producing a third set of input values by performing a reverse lookup to determine a plurality of input values that yields at least a portion of said second set of input values when said first curve is applied to said plurality of input values;

generating, by way of said one or more processors, an aggregated curve that is represented by at least a portion of said first set of input values associated with at least a portion of said third set of output values, and wherein said aggregated curve is further represented by at least a portion of said third set of input values associated with at least a portion of said second set of output values; and creating, by way of said one or more processors, an output image by utilizing said aggregated curve to apply said first effect and said second effect to said digital image;

wherein said aggregated curve is represented by a look-up table having a plurality of input values from said first set of input values and from said third set of input values, and wherein said look-up table includes a plurality of output values from said third set of output values and from said second set of output values.

15. The media of claim 14, wherein said creating said output image is performed by a graphics processing unit.

16. The media of claim 14, wherein said producing said third set of input values utilizes linear interpolation.

17. The media of claim 14, wherein said method further comprises displaying said output image to a user.

* * * * *

UNITED STATES PATENT AND TRADEMARK OFFICE
CERTIFICATE OF CORRECTION

PATENT NO. : 7,656,415 B2 Page 1 of 1
APPLICATION NO. : 11/414773
DATED : February 2, 2010
INVENTOR(S) : Denis C. Demandolx It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 551 days.

Signed and Sealed this

Thirtieth Day of November, 2010

David J. Kappos
*Director of the United States Patent and Trademark Office*